United States Patent Office 3,741,909
Patented June 26, 1973

3,741,909
ANTIOXIDANT COMPOSITION TO STABILIZE ORGANIC MATERIALS
Izumi Yamane, Yokohama, Masuzo Nagayama, Tokyo, and Makoto Takai, Chiba, Japan, assignors to Lion Fat & Oil Co., Ltd., Tokyo, Japan
No Drawing. Filed May 4, 1971, Ser. No. 140,301
Claims priority, application Japan, May 9, 1970, 45/39,526
Int. Cl. C08f 45/58
U.S. Cl. 252—401                                          6 Claims

ABSTRACT OF THE DISCLOSURE

A stable organic material composition prepared by mixing a compound expressed by the general formula:

$$\left( R-S-X-\overset{O}{\underset{\|}{C}}-O \right)_n \cdot M$$

(wherein R represents hydrocarbon radical having 6-22 carbon atoms, X represents a lower alkylene radical having 1-5 carbon atoms, M represents non-alkali metal and n represents an integer ranging from 1 to 5), along with a phenol-type antioxidant or amine-type antioxidant, with such an organic material as synthetic resin, rubberlike substance, various oils, etc.

BACKGROUND OF THE INVENTION (a) Field of the invention

The present invention relates to a stable organic material composition having an excellent oxidation resistance.

(b) Description of the prior art

It is a well known fact that such organic materials as plastic, synthetic fiber, rubber, lubricating oil, etc. are prone to get oxidized and deteriorate in the presence of oxygen and lose their intrinsic properties. Accordingly, with a view to preventing said deterioration due to oxidation, a variety of antioxidants have so far been developed and put on the market. Substances of relevant techniques have also been open to the public through scientific periodicals as well as Patent Gazettes. However, those antioxidants available on the market fall short of full realization of the desired properties in spite of their expensiveness. In other words, some of the commercial antioxidants are defective in that they are poor in compatibility for organic materials so that the antioxidant contained in moldings tends to separate and bleed out to the surface due to decrease in the solubility thereof with the drop in temperature after molding. As a result, they not only bring about a coarse surface texture, decrease in transparency and change in color tone of the moldings to thereby considerably impair the commercial value thereof but also occasionally fall off the moldings in the course of such treatment as washing with water. Therefore, long lasting stable efficiency of these antioxidants can hardly be expected.

Principal object of the present invention is to provide an organic material composition which is very effective in preventing oxidation of organic materials.

Another object of the present invention is to provide an organic material composition which is durable in use for hours at a high temperature.

A further object of the present invention is to provide an organic material composition whose surface is free of deterioration due to bleeding.

A still further object of the present invention is to provide an organic material composition which comprises an antioxidant having an excellent compatibility for organic materials.

SUMMARY OF THE INVENTION

The present invention relates to a stable organic material composition which is prepared by mixing an organic material with a compound expressed by the general formula $$\left( R-S-X-\overset{O}{\underset{\|}{C}}-O \right)_n \cdot M$$

(wherein R represents hydrocarbon radical having 6-22 carbon atoms, X represents a lower alkylene radical having 1-5 carbon atoms, M represents non-alkali metal and n represents an integer ranging from 1 to 5) along with a phenol-type antioxidant or amine-type antioxidant.

In other words, the present invention is characterized by the stabilization of organic materials, which are apt to deteriorate due to oxidation or similar reactions while being stored or used, by means of a specific antioxidant mixed therewith. The antioxidant to be applied in the present invention comprises a compound expressed by the above described general formula and a known phenol-type antioxidant or a known amine-type antioxidant. The art of combined use of plural antioxidants has already been put into practice in the field of industry, and it is a well-known fact that the combined use of such antioxidants as functioning as the radical chain stopper and such antioxidants as functioning as the peroxide decomposing agent are particularly effective. This notwithstanding, the present inventors have prepared varieties of antioxidants and examined them with a view to obtaining a stable organic material composition, and, as a result, they have come to the finding that the combined use of a compound expressed by the afore-mentioned general formula and a phenol-type or amine-type antioxidant can bring about an unprecedentedly powerful antioxidation effect. Typical compounds applicable in the present invention as the phenol-type antioxidant include:

p-hydroxyphenyl cyclohexane
2,6-di-tert-butyl-4-methylphenol
2,4,6-tri-tert-butylphenol
1,1′-methylene-bis-(4-hydroxy-2,5-tert-butylphenol)
2,2′-methylene-bis-(4-methyl-6-tertbutylphenol)
2,6′-(2-tert-butyl-4-methyl-6-methylphenol)-p-cresol
2,2′-thio-bis-(4-methyl-6-tert-butylphenol)
4,4′-thio-bis-(3-methyl-6-tert-butylphenol)
4,4′-butylidene-bis-(6-tert-butyl-3-methylphenol)
styrenated phenol
di-p-hydroxyphenyl cyclohexane
dicresyl propane Typical amine-type antioxidants applicable in the present invention include:

phenyl-α-naphthylamine
phenyl-β-naphthylamine
diphenylamine
N,N′-diphenyl-p-phenylene diamine
N,N′-di-β-naphthyl-p-phenylene diamine
N,N′-phenyl cyclohexyl-p-phenylene diamine
p-hydroxy diphenylamine
p-hydroxyphenyl-β-naphthylamine
2,2′,4-trimethyl dihydroquinoline The compound expressed by the general formula according to the present invention is synthesized through the following process.

$$RCH=CH_2 + HSCH_2COOH \xrightarrow[\text{50-70° C.—1.5 hr.}]{\text{irradiation of ultraviolet ray}}$$

$$R-CH_2CH_2SCH_2COOH \rightarrow$$
$$R-CH_2CH_2SCH_2COONa \rightarrow$$
$$(R-CH_2CH_2SCH_2COO)_2Ca$$

In the general formula according to the present invention, R is hydrocarbon radical having 6–22 carbon atoms—preferably hydrocarbon radical having 12–20 carbon atoms. In case the number of carbon atoms is less than 6, evaporation loss is too much at the time of heating at high temperature, while in case it is more than 22, not only industrially economical production of the intended composition is hampered but also the compatibility toward organic materials tends to decrease, so that both cases are undesirable. M is hydrogen or a non-alkali metal—preferably H, Ca, Al, Ni, Mg or Co. In case of alkali metals much as Na and K, there are instances where deterioration of organic materials is rather accelerated. X is a lower alkylene radical having 1–5 carbon atoms—preferably a lower alkylene radical having 1–3 carbon atoms.

The maximum efficiency of the novel antioxidant according to the present invention can be displayed when the compound expressed by the foregoing general formula is combined with said phenol-type or amine-type antioxidant at the ratio of 15–85% (by weight) of the latter. It goes without saying that the optimum ratio in this combination varies with the uses aimed at, but the selective application of the foregoing ratio in order to bring about a desirable effect is one of the features of the present invention.

The novel antioxidant composition according to the present invention can serve efficiently in various ways for use in organic materials vulnerable to deterioration by oxidation. Said organic materials suitable for applying the present antioxidant composition include: plastics, e.g. such polyolefins as polyethylene, polypropylene, polybutene-1, polypentene-1, etc. as well as their copolymers or substances similar thereto such as ethylene-propylene copolymer, ethylene-vinyl acetate copolymer, propylene-vinyl acetate copolymer, etc., and, in addition, polystyrene, polyester, polyamide as well as their copolymers or substances similar thereto; rubberlike substances such as natural rubber, EPT-rubber, SBR-rubber, neoprene rubber, butyl rubber, nitrile rubber, chloroprene rubber as well as substances similar thereto; and oils such as synthetic lubricating oil, industrial oil, automatic gearing liquid, turbine oil, cutting oil, gear oil, hydrocarbon wax, gasoline, jet fuel, etc.

The antioxidant composition according to the present invention can be added to said organic materials by optional means. For instance, it can be either applied after diluting with an optional solvent which works on both the antixodant composition and organic materials or applied directly as it is. Addition of the present antioxidant composition can be performed either by applying a mixture prepared in advance by mixing said phenol-type or amine-type antioxidant with the compound specified in the present invention or by applying these ingredients individually. Mixing of such substances as plastics, rubbers, synthetic fibers, etc. which are solid at the room temperature can be readily performed by means of conventional machines such as mixer, kneader and roll and conventional processes of mixing. On this occasion, some ultraviolet ray absorbent, antistatic agent, hardly inflammable material, filler, etc. may be added as occasion demands.

As described above, the antioxidant according to the present invention comprises the compound expressed by the above mentioned general formula and a known phenol-type or amine-type antioxidant combined therewith, and it proves superior to any conventional antioxidant prepared by combining two or more commercial antioxidants heretofore in industrial use. That is, the present antioxidant not only is capable of demonstrating an excellent antioxidation effect by its very nature but also shows a minimum evaporation loss, is durable in serving for a long period of time at high temperature and prevents the deterioration of the surface of the products which arises from bleeding. These effects of the present antioxidant is much more enhanced when the compound expressed by the aforesaid general formula is applied at the ratio of 15–85% (by weight) of said phenol-type or amine-type antioxidant to be combined therewith, as described in the foregoing.

DESCRIPTION OF THE PREFERRED EMBODIMENTS

Hereunder given are examples embodying the present invention.

Example 1

Polyethylene pellets not containing any other antioxidant and the respective antioxidant shown in Table 1 were simultaneously extruded by an extruding machine to thereby kneading them with each other so as to obtain pellets having overall concentration of 0.2% in terms of antioxidant, and then these pellets were subjected to injection molding to form into 2 mm. thick plate. This plate was placed on a glass plate put in a thermostat having a temperature of 120° C.±3° C. and left standing for 150 hrs. Subsequently, the plate was pelletized again by cutting with a cutting machine, and the melt index was measured of the resulting pellets in accordance with ASTM. Besides, the surface condition and the degree of coloring of said pellets were also judged through observation with the naked eye. The composition under the present invention proved stable against heat. The results were as shown in Table 1.

Example 2

Various antioxidants were kneaded with polypropylene in the same way as in Example 1, obtaining overall concentration of 0.5% (by weight) in terms of antioxidant, and the same measurements as in Example 1 were conducted. The results were as shown in Table 2. The polypropylene composition under the present invention showed no deterioration, little coloring and no loss of surface luster.

Example 3

1 kg. of ABS resin and 10 g. each of various antioxidants were blended (simultaneously) with each other by means of Henshell mixer for 10 minutes, and the thus blended mixture was pelletized through kneading by an extruding machine. The pellets thus prepared were further subjected to extrusion molding at 220° C. to form into 1 mm. thick plate. Upon heating this plate at 120° C. to expedite deterioration thereof, the resulting fragility was measured to observe the effect of the stabilizer. Besides, the degree of coloring and the surface condition of the respective plate subsequent to heating 120° C. for 150 hrs. were also judged through observation with the naked eye. The results were as shown in Table 3. The antioxidant under the present invention displayed satisfactory performances.

Example 4

The below-mentioned lubricating oil (solvent refining paraffin oil) was mixed with antioxidants in the total amount of 0.05% (by weight), and the oxidation preventing effect was measured by applying the standard rotary bomb oxidation test ASTM D·2272–64 T. That is, the bomb provided with a pressure gage was filled with oxygen to the extent of 6.32 kg./cm.$^2$ and held at 150° C. The period from the time when the maximum pressure was attained to the time when the pressure fell by 1.76 kg./cm.$^2$ from the maximum pressure was recorded as the induction period, and this induction period was made an index of the efficiency of antioxidant.

Lubricating oil:
 Specific gravity (API): 32.2 Bé.
 Kinematic viscosity (99° C.): 39.5 cs.
 Flash point: 193° C.
 ASTM color tone: 0.5
 Neutralization value: 0

TABLE 1

| Antioxidant under the present invention (A) | Known antioxidant (B) | Heat treatment at 120° C. for 150 hrs. | | |
|---|---|---|---|---|
| | | Melt index | Surface condition | Coloring |
| $C_{16}H_{33}SCH_2CH_2COOH$ $(C_{16}H_{33}SCH_2CH_2COO)_2Ca$ | 2,6-di-t-butyl-4-methylphenol | 4.13 | Satisfactory | None. |
| $C_{16}H_{33}SCH_2CH_2COOH$ $(C_{16}H_{33}SCH_2CH_2COO)_2Ca$ | 2,2'-methylene-bis-(4-methyl-6-t-butylphenol) | 4.10 | do | Do. |
| $C_{16}H_{33}SCH_2CH_2COOH$ $(C_{16}H_{33}SCH_2CH_2COO)_2Ca$ | 4,4'-methylene-bis-(2,6-di-t-butylphenol) | 4.11 | do | Do. |
| $C_{16}H_{33}SCH_2CH_2COOH$ $(C_{16}H_{33}SCH_2CH_2COO)_2Ca$ | 4,4'-thio-bis-(6-t-butyl-3-methylphenol) | 4.00 | do | Do. |
| $C_{16}H_{33}SCH_2CH_2COOH$ $(C_{16}H_{33}SCH_2CH_2COO)_2Ca$ | Phenyl-β-naphthylamine | 4.16 | Luster was slightly lost | Light brown. |
| $C_{16}H_{33}SCH_2CH_2COOH$ | | 3.82 | Satisfactory | Almost none. |
| $(C_{16}H_{33}SCH_2CH_2COO)_2Ca$ | | 3.76 | do | Do. |
| | 2,6-di-t-butyl-4-methylphenol | 2.72 | No luster | Light yellow. |
| | 2,2'-methylene-bis-(4-methyl-6-t-butylphenol) | 2.66 | do | Do. |
| | 4,4'-methylene-bis-(2,6-di-t-butylphenol) | 2.83 | do | Do. |
| | 4,4'-thio-bis-(6-t-butyl-3-methylphenol) | 2.77 | do | Do. |
| | Phenyl-β-naphthylamine | 3.89 | Luster was lost and became white | Dark reddish-brown. |

Given hereunder are comparative examples wherein the known antioxidants were jointly used.
A/B=50/50; overall concentration=0.2%

| Comparative examples: | | | | |
|---|---|---|---|---|
| $\begin{array}{c}CH_2CH_2COOC_{12}H_{25}\\ S\diagdown\\ CH_2CH_2COOC_{12}H_{25}\end{array}$ | 2,6-di-t-butyl-p-cresol | 3.66 | Luster was slightly lost | Almost none. |
| $\begin{array}{c}CH_2CH_2COOC_{12}H_{25}\\ S\diagdown\\ CH_2CH_2COOC_{12}H_{25}\end{array}$ | | 1.10 | No luster | Light yellow. |

TABLE 2

| Antioxidant under the present invention (A) | Known antioxidant (B) | Ratio of A/B | After heating at 120° C. for 150 hrs. | | |
|---|---|---|---|---|---|
| | | | Melt index | Surface condition | Coloring. |
| $(C_{16}H_{33}SCH_2COO)_2Mg$ | 2,6-di-t-butyl-p-cresol | 100/0 | 3.62 | Satisfactory | Almost none. |
| | | 75/25 | 4.11 | do | None. |
| | | 50/50 | 4.01 | do | Do. |
| | | 25/75 | 3.96 | do | Do. |
| | | 0/100 | 1.16 | Luster was slightly lost | Light yellow. |
| Comparative examples wherein the known antioxidants were employed | | | | | |
| $\begin{array}{c}CH_2CH_2COOC_{12}H_{25}\\ S\diagdown\\ CH_2CH_2COOC_{12}H_{25}\end{array}$ | 2,6-di-t-butyl-p-cresol | 25/75 | 2.88 | Luster was slightly lost | Almost none. |
| $\begin{array}{c}CH_2CH_2COOC_{12}H_{25}\\ S\diagdown\\ CH_2CH_2COOC_{12}H_{25}\end{array}$ | | | 1.00 | Luster was lost | Light yellow. |

NOTE.—Antioxidant: overall concentration=0.5%.

TABLE 3

| Antioxidant under the present invention (A) | Known antioxidant (B) | Ratio of A/B | After heating at 120° C. for 150 hrs. | | |
|---|---|---|---|---|---|
| | | | No. of days required for deterioration by oxidation at 120° C. | Coloring | Surface condition |
| $C_{16}H_{33}SCH_2COOH$ | Phenyl-β-naphthylamine | 100/0 | 100 | Brown | Satisfactory. |
| | | 75/25 | 115 | do | Do. |
| | | 50/50 | 111 | do | Do. |
| | | 25/75 | 108 | do | Do. |
| | | 0/100 | | Dark reddish brown | Luster was lost; growth of white film on the surface was observed. |

NOTE.—Antioxidant: overall concentration=1.0%.

TABLE 4

| Antioxidant under the present invention (A) | Known antioxidant (B) | Ratio of A/B | Induction period (min.) |
|---|---|---|---|
| $C_{12}H_{25}SCH_2COOH$ | 2,6-di-t-butyl-4-methylphenol | 100/0 | 102 |
| | | 75/25 | 125 |
| | | 50/50 | 110 |
| | | 25/75 | 82 |
| | | 0/100 | 53 |

Note.—Overall concentration of antioxidant measured in accordance with ASTM D-2272-64 T=0 05%.

What is claimed is:
1. A composition consisting essentially of a mixture of
(A) organic material selected from the group consisting of synthetic moldable resins, rubbers, oils, waxes and fuels
(B) an antioxidant selected from the group consisting of
  p-hydroxyphenyl cyclohexane
  2,6-di-tert-butyl-4-methylphenol
  2,4,6-tri-tert-butylphenol
  1,1'-methylene-bis-(4-hydroxy-2,5-tert-butylphenol)
  2,2'-methylene-bis-(4-methyl-6-tert-butylphenol)
  2,6'-(2-tert-butyl-4-methyl-6-methylphenol)-P-cresol
  2,2'-thio-bis-(4-methyl-6-tert-butylphenol)
  4,4'-thio-bis-(3-methyl-6-tert-butylphenol)
  4,4'-butylidene-bis-(6-tert-butyl-3-methylphenol)
  styrenated phenol
  di-p-hydroxyphenyl cyclohexane
  dicresyl propane
  phenyl-α-naphthylamine
  phenyl-β-naphthylamine
  diphenylamine
  N,N'-diphenyl-p-phenylene diamine
  N,N'-di-β-naphthyl-p-phenylene diamine
  N,N'-phenyl cyclohexyl-p-phenylene diamine
  p-hydroxy diphenylamine
  p-hydroxyphenyl-β-naphthylamine
  2,2',4-trimethyl dihydroquinoline
and (C) a compound of the formula

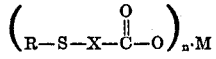

wherein R is a hydrocarbon radical having from 6 to 22 carbon atoms; X is an alkylene radical having from 1 to 5 carbon atoms; M is H, Ca, Al, Ni, Mg or Co; and $n$ is an integer from 1 to 5
the amount of (C) being from 15 to 85% by weight of (B) and the sum of (B) plus (C), relative to (A), being a small amount effective to prevent oxidation of (A).
2. A composition according to claim 1, wherein R is hydrocarbon radical having 12–20 carbon atoms.
3. A composition according to claim 1, wherein X is a lower alkylene radical having 1–3 carbon atoms.
4. An antioxidant composition consisting essentially of
(A) a compound selected from the group consisting of
  p-hydroxyphenyl cyclohexane
  2,6-di-tert-butyl-4-methylphenol
  2,4,6-tri-tert-butylphenol
  1,1'-methylene-bis-(4-hydroxy-2,5-tert-butylphenol)
  2,2'-methylene-bis-(4-methyl-6-tert-butylphenol)
  2,6'-(2-tert-butyl-4-methyl-6-methylphenol)-P-cresol
  2,2'-thio-bis-(4-methyl-6-tert-butylphenol)
  4,4'-thio-bis-(3-methyl-6-tert-butylphenol)
  4,4'-butylidene-bis-(6-tert-butyl-3-methylphenol)
  styrenated phenol
  di-p-hydroxyphenyl cyclohexane
  dicresyl propane
  phenyl-α-naphthylamine
  phenyl-β-naphthylamine
  diphenylamine
  N,N'-diphenyl-p-phenylene diamine
  N,N'-di-β-naphthyl-p-phenylene diamine
  N,N'-phenyl cyclohexyl-p-phenylene diamine
  p-hydroxy diphenylamine
  p-hydroxyphenyl-β-naphthylamine
  2,2'-5-trimethyl dihydroquinoline
and (B) a compound of the formula

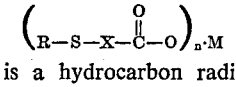

wherein R is a hydrocarbon radical having from 6 to 22 carbon atoms; X is an alkylene radical having from 1 to 5 carbon atoms; M is H, Ca, Al, Ni, Mg or Co; and $n$ is an integer from 1 to 5
the amount of (B) being from 15 to 85% by weight of (A).
5. A composition according to claim 4, wherein R is a hydrocarbon radical having 12–20 carbon atoms.
6. A composition according to claim 4, wherein X is a lower alkylene radical having 1–3 carbon atoms.

References Cited
UNITED STATES PATENTS
3,501,520   3/1970   Giolito _____ 252—406

LEON D. ROSDOL, Primary Examiner

I. GLUCK, Assistant Examiner

U.S. Cl. X.R.

252—402, 404, 400; 260—45.85, 45.95, 429.9, 429 K, 526 S